A. MIDDLETON, Jr.
BUMPER AND DRAW-BAR FOR RAILROAD-CARS.
No. 7,551. Reissued March 6, 1877.
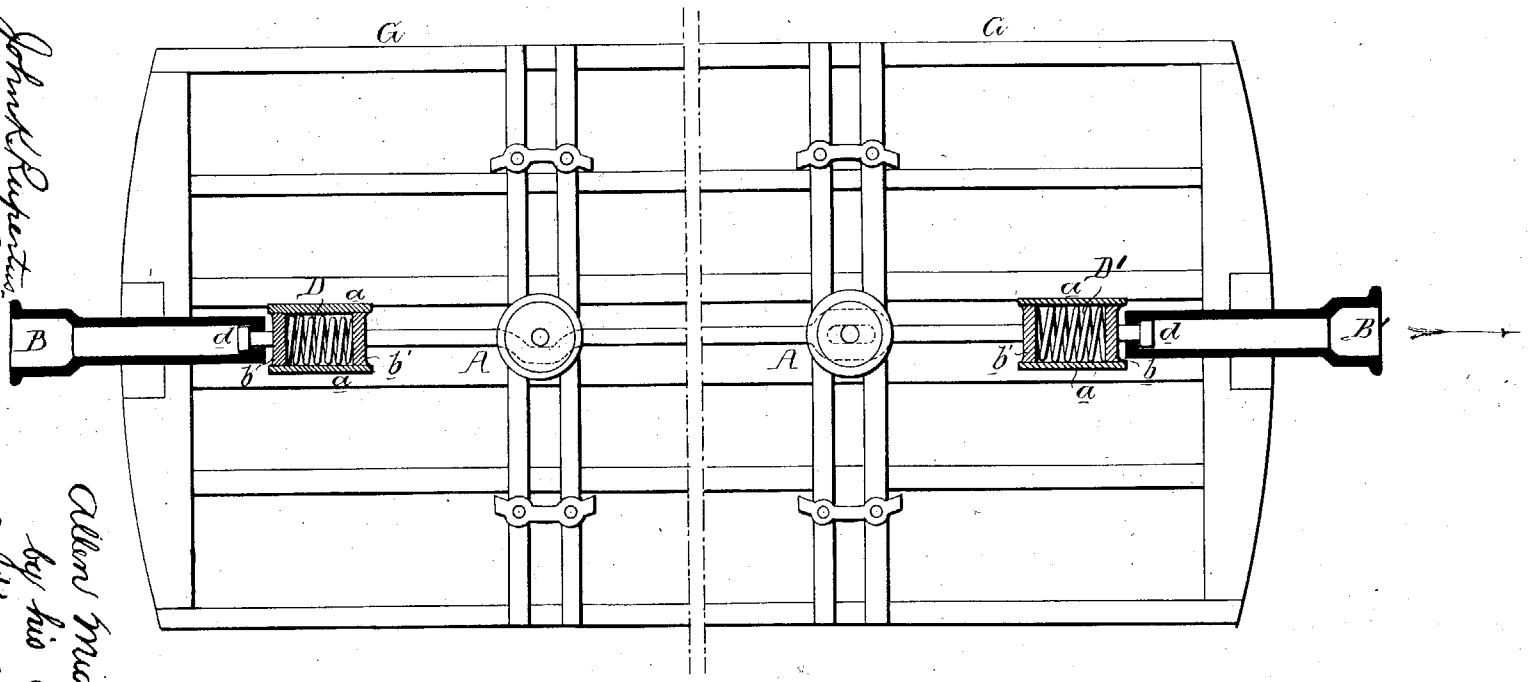
Witnesses John K. Rupertus
Harry Smith
Allen Middleton,
by his Attorneys
Howson & Son

UNITED STATES PATENT OFFICE.

ALLEN MIDDLETON, JR., OF PHILADELPHIA, PENNSYLVANIA.

IMPROVEMENT IN BUMPERS AND DRAW-BARS FOR RAILROAD-CARS.

Specification forming part of Letters Patent No. 142,492, dated September 2, 1873; reissue No. 7,551, dated March 6, 1877; application filed February 16, 1877.

*To all whom it may concern:*

Be it known that I, ALLEN MIDDLETON, Jr., of Philadelphia, Pennsylvania, have invented a Combined Bumper and Draw-Bar for Railroad-Cars, of which the following is a specification:

The object of my invention is to obviate the severe strains to which railroad-cars are subjected on starting trains; and this object I attain by means of a rod, A, or its equivalent, connected to bumper and draw-heads B at both ends of the car, and passing through and operating in conjunction with springs D D′, substantially as shown in the inverted plan view in the accompanying drawing, so that, in starting the train, the pulling-force at one end of the car will be exerted, through the medium of the spring, at the opposite end of the car, and will be transmitted through the entire frame-work, the said springs also serving as bumper-springs, to absorb the shocks which take place when the cars meet.

G represents the frame-work of an ordinary car, and near the opposite ends of the same are secured springs D and D′, each consisting in the present instance of two side plates, *a a*, two cross-plates, *b* and *b′*, and intervening elastic medium of any appropriate character. The rod A extends from one spring to the other, and passes through both springs, and has at each extreme end a head, *d*, contained within the adjoining draw and bumper head B, so that the latter, when pulled outward, will draw the bar in the same direction, but, when pushed inward, will slide independently of the said bar.

Supposing the bumper-head B′, at the end of the car to the right, to be drawn in the direction of the arrow, the rod A must necessarily follow, and this it will do without acting upon the spring D′; it will, however, pull the bumper-head at the opposite end of the car against the plate *b* of the spring D, the elasticity of which will lessen the shock, but the further pulling-force exerted by the rod to draw the car forward in the direction of the arrow will be transmitted through the entire frame work of the car from the spring D outward; hence the frame cannot be subjected to the severe strains which, with the usual connections, it will experience on starting a train. When the car is drawn in a direction opposite to that pointed out by the arrow the pull will take place from the spring D′, and when two cars meet the bumper-heads will be forced against the plates *b* of the springs, and the latter, consequently, diminish the shocks.

It is essential in carrying out my invention that the draw-bar should pass through the springs, so that there may be a more direct pull against the springs than when two bars, one on each side of the spring, are used, and so that simplicity of construction and connection of the bar to the bumper-heads may be insured.

It will be noticed that the draw-bar is slotted at one point and bent at another, to escape the king-bolts; either of these plans may be adopted.

I claim as my invention—

1. The combination, in a railroad-car, of springs D D′, a draw-bar, A, passing through the said springs and bumper-heads B B′, one of which is connected to each end of the said bar, substantially as described, so as to slide inwardly independently of the same, but outwardly with the said bar, as set forth.

2. The combination of the spring-boxes D D′, bumper-heads B B′, and the draw-bar A, passing through the said springs and through the movable and fixed plates *b b′*, and having heads *d*, adapted to the bumper-heads, all substantially as and for the purpose set forth.

In testimony whereof I have signed my name to this specification in the presence of two subscribing witnesses.

ALLEN MIDDLETON, JR.

Witnesses:

HERMANN MOESSNER,
HUBERT HOWSON.